United States Patent [19]
Themelin et al.

[11] Patent Number: 5,409,086
[45] Date of Patent: Apr. 25, 1995

[54] FITTING BRAKE LINING WITH STUDS

[75] Inventors: Luc Themelin, Mery/Oise; Georges Cornillon, Les Pavillons-Sous-Bois; Michel Altmeyer, Paris, all of France

[73] Assignee: Le Carbone-Lorraine, Courbevoie, France

[21] Appl. No.: 208,710

[22] Filed: Mar. 11, 1994

[30] Foreign Application Priority Data

Mar. 12, 1993 [FR] France ............... 93 03104

[51] Int. Cl.6 .................. F16D 65/38; F16D 69/00
[52] U.S. Cl. ................ 188/73.37; 188/242; 188/250 G; 188/250 B
[58] Field of Search ........... 188/73.37, 250 R, 250 E, 188/250 G, 250 B, 251 A, 251 R, 256, 257, 258, 242; 192/107 R; 411/84, 85

[56] References Cited

U.S. PATENT DOCUMENTS

| | | | |
|---|---|---|---|
| 2,705,991 | 4/1955 | Reiner | 411/84 |
| 3,259,165 | 7/1966 | Tobian et al. | 411/85 |
| 4,535,874 | 8/1985 | Pollinger et al. | 188/250 G X |
| 4,580,673 | 4/1986 | Graton | 188/250 G X |
| 4,640,390 | 2/1987 | Saumweber et al. | 188/250 B X |

FOREIGN PATENT DOCUMENTS

| | | |
|---|---|---|
| 0106782 | 4/1984 | European Pat. Off. |
| 0428191 | 5/1991 | European Pat. Off. |
| 8514607 | 8/1985 | Germany |

*Primary Examiner*—Robert J. Oberleitner
*Assistant Examiner*—Kevin D. Rutherford
*Attorney, Agent, or Firm*—Dennison, Meserole, Pollack & Scheiner

[57] ABSTRACT

The lining (1) includes by studs (2) mounted on a support (3), each being rigid with the support by reason of a mounting element and is characterized in that
- a) the mounting element (5) consists of a base (9) with a flange (13) with no axial symmetry,
- b) the support (3) consists of two metal plates, a rigid support plate (7) and a mounting plate (6) having orifices (10) in order to be able to grip the said flange (13) by reason of mechanical connections (8) between these two plates (6, 7),
- c) at least one of the plates (6, 7) displaying a deformation in such a way as to grip the flange and so achieve rotational locking of the stud (2).

13 Claims, 9 Drawing Sheets

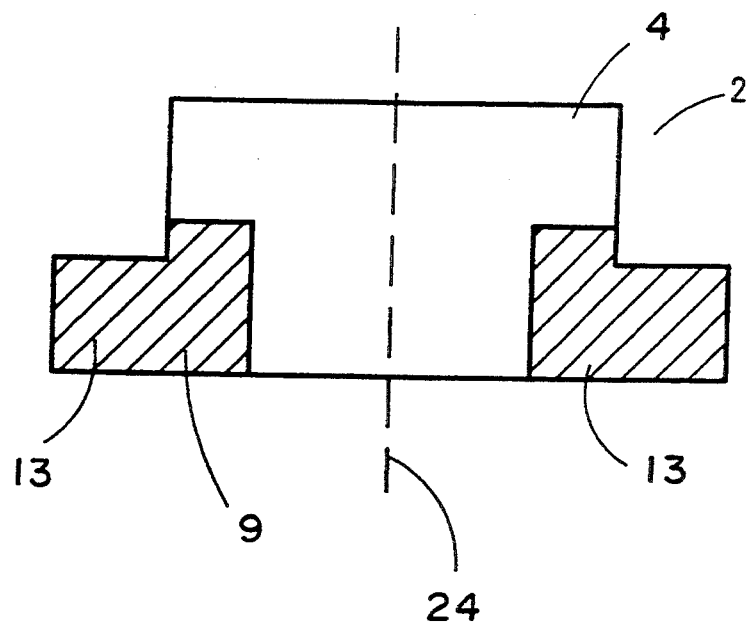
FIG. 5a
FIG. 5b
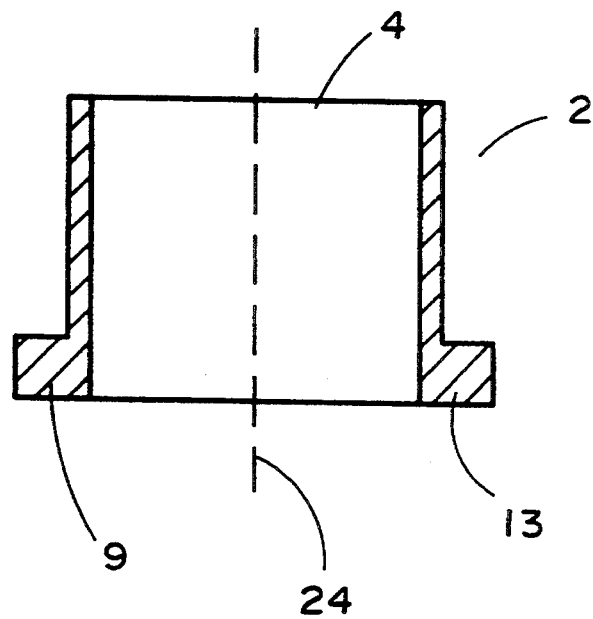

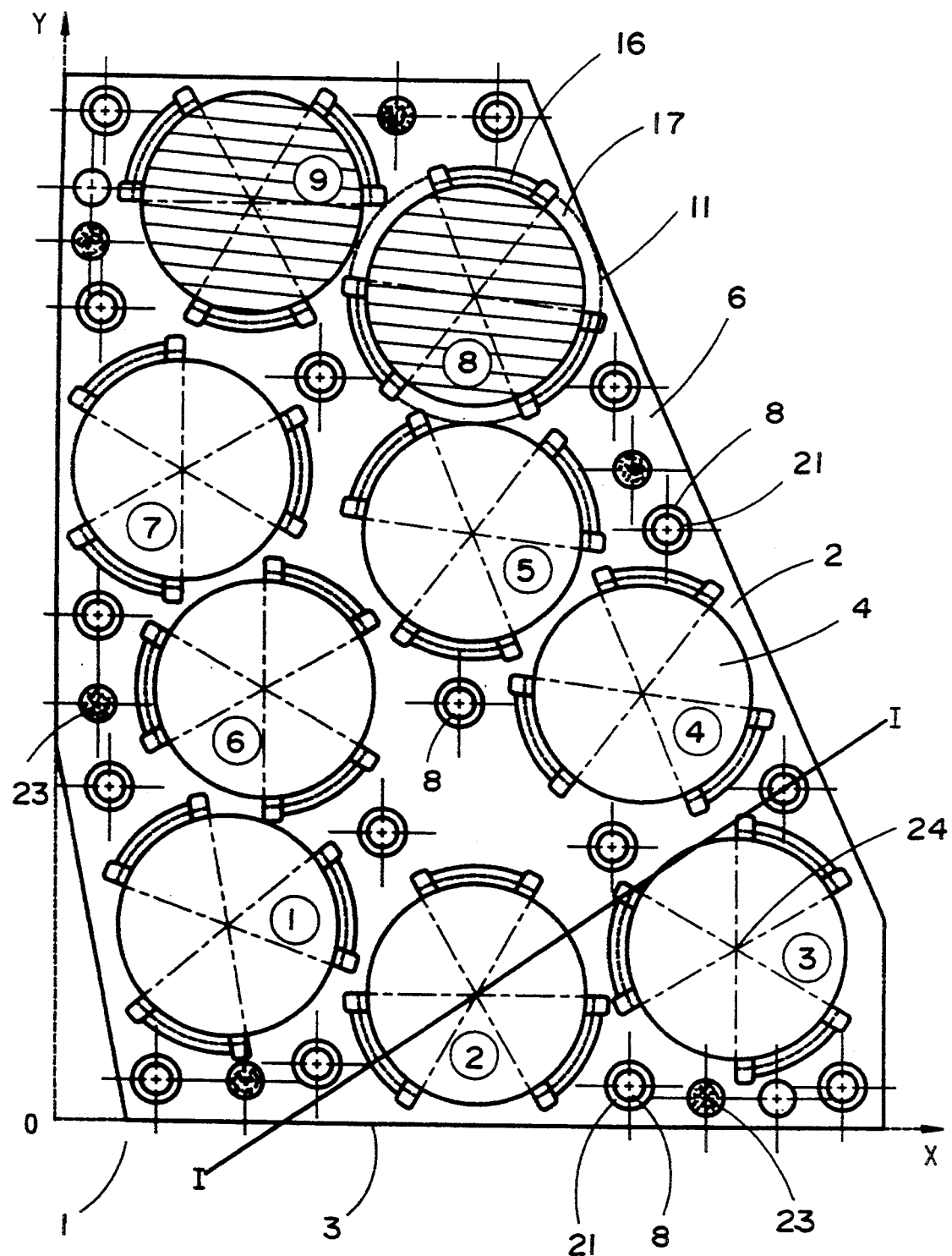

FIG. 6b
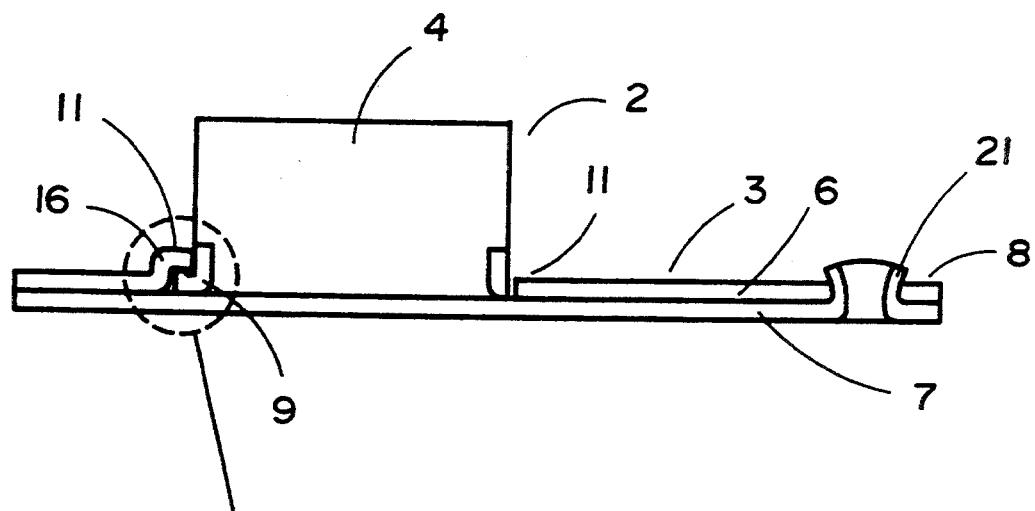
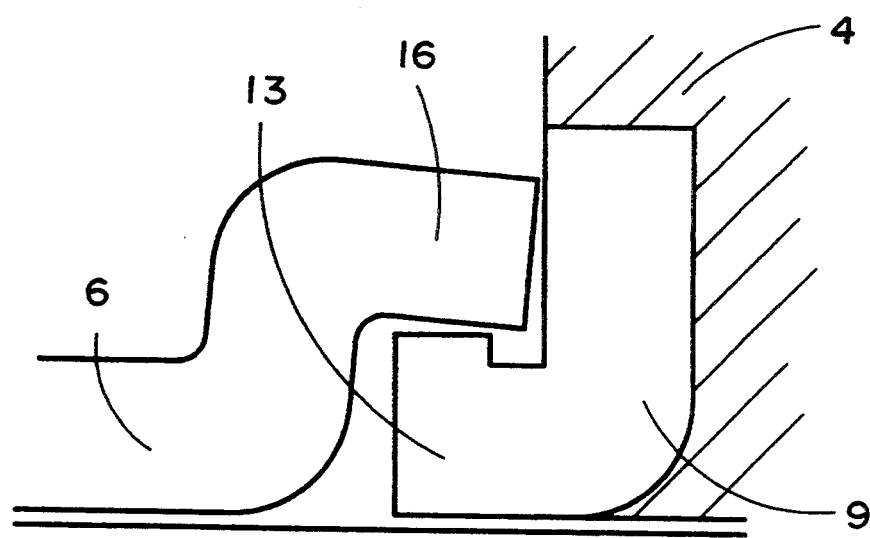
FIG. 6c

FITTING BRAKE LINING WITH STUDS

FIELD OF THE INVENTION

The invention relates to the field of brakes and in particular that of brake linings (e.g. disc brake pads) consisting of friction studs mounted on a generally plane support, said linings being intended to be changed when the studs are worn out.

PRIOR ART

Numerous brake lining configurations are already known.

For example, European Patent EP-B1-106 782 describes a plurality of types of mountings of friction studs on a support. In this Patent, the friction studs are constituted by a friction block of sintered metal and a mounting element: a rod the cross-section of which is less than that of the said block. As shown in FIGS. 1 to 11 of this European Patent EP-B1-106 782, the studs and the support can be mounted in three possible ways:

according to a first method, the only one claimed, the studs are mounted on a flexible plate provided with regularly spaced orifices of a cross-section substantially close to that of the said rod, fixing being performed by introducing the said rods into the said orifices and deforming the head of the said rod to produce the equivalent of a rivet. The flexible plate is itself riveted to a rigid plate provided with a fixing lug. With this method, shown in FIG. 6, the studs are able to flex individually under the action of mechanical stress, thanks to the flexibility of the said flexible plate;

according to a second method shown in FIGS. 9 and 10, the studs are mounted on a rigid plate provided with regularly spaced orifices of which the cross-section is substantially close to that of the said rod, the fixing being achieved by introducing the said rods into the said orifices and deforming the head of the said rod in order to produce the equivalent of a rivet. The rigid plate is provided with a fixing lug;

according to a third method, shown in FIGS. 9 and 11, the studs are mounted on a rigid plate by welding or brazing the head of the said rods onto a rigid plate itself provided with a fixing lug.

Furthermore, from European Patent EP-A1-428 191, a brake lining is also known which is shown in FIGS. 2 and 3 and which is obtained by mounting (similar to riveting) of friction studs constituted by a friction block contained in a metal sleeve rigid with a rod with a machined head and smaller in diameter than the said block, the said sleeve with its head constituting an element for mounting on a rigid plate provided with frustoconical orifices.

PROBLEM POSED

In order to be able to meet the current demands of the market, the Applicants have sought to resolve several types of problem at the same time:

on the one hand, they sought a viable solution to the problem of the loss of friction studs during braking, a problem often encountered with the products already known, and realised that in order to achieve this, it was necessary to obtain a lining with studs which are rotationally locked;

on the other, they sought a simple and economical way of obtaining these linings with rotationally locked studs and featuring rapid indexing to facilitate their fitment, and this without having to resort either to compact stacking of hexagonal studs or fixing by brazing/welding as described in EP 106 782. Indeed, firstly it is preferable that the friction studs be spaced apart in order to improve the thermographic image of the lining vis-a-vis the disc when brakes are applied, and in order to facilitate their cooling and the elimination of debris due to wear.

On the other hand, fixing by brazing/welding has drawbacks (rigidifying of the assembled parts, the problem of monitoring the weld/brazed joint);

finally, modern quality demands are calling more and more for controls in order to guarantee the quality of the product delivered to the customer and in order to avoid the product undergoing expensive acceptance tests.

The non-destructive checking of welds/brazed joints, although known per se, is not an inexpensive undertaking nor is it easy to carry out when numerous parts to be welded are present on one and the same article of small dimensions. Therefore, the Applicants have sought a means of fixing friction studs on a support which does not resort to known welding/brazing techniques, while at the same time guaranteeing a high level of reliability in the mounting system.

DESCRIPTION OF THE INVENTION

The brake lining according to the invention is constituted by friction studs mounted on a support and forming a friction surface, each of the said friction studs comprising a friction block the cross-section of which is constant over its entire height, rigid with an element for mounting the said stud on the said support, the said support comprising at least one rigid metal plate provided with a fixing lug, and it is characterised in that a) the said mounting element consists of a base of the said friction block having a flange with no axial symmetry and outside the perpendicular projection of the said block on the said support;

b) the said support consists of two metal plates, a rigid so-called support plate provided with the said fixing lug and a so-called mounting plate comprising orifices of which the cross-section is close to that of the said block in order that the said flange can be gripped between all or part of a ring of the said mounting plate defining each said orifice and the said rigid mounting plate, thanks to mechanical connecting means between these two plates, comprising the cooperation of male elements on one plate with corresponding female elements on the other plate;

c) at least one of the said plates has a localised deformation (close to the said orifices) of depth E, cooperating with all or part of the said flange of thickness E' (E'>E), in order to grip the said flange and so obtain rotational locking of the said friction stud.

The solution found by the Applicants economically solves all the problems posed, whether the problems relate to the tearing away of the studs, their rotational locking or the demand for quality.

Indeed, the lining according to the invention is obtained very simply as will be seen immediately from examination of the lining according to the invention;

manufacture of friction studs consisting of a friction block of a per se known friction material rigid with a base of a shape peculiar to the invention;

manufacture of mounting and support plates by known operations which can be automated, for deforming metal materials in strips (deep drawing, snarling, cutting etc) in order to form the said mechanical connecting means (male and female elements) and the said localised deformation which makes it possible to grip the said flange;

mounting of the friction studs and plates forming their support causing the said male and female elements to cooperate, which does not necessitate recourse to other means (rivets for example) in order to apply tension to the gripping of the flange of the studs between the so-called mounting and support plates.

This simplicity of manufacture of brake linings according to the invention produces an economic advantage due to their low relative cost.

An important characteristic of brake linings according to the invention resides in the fact that the friction studs are maintained rigid with their support without any rigid connection since the flange on each friction stud is only gripped between two plates.

Indeed, tests have shown that in order to obtain a prolonged working life (at least two years) of the brake lining, it was very important for the friction studs to be both entirely rigid with their support and of course to show no tendency to be torn away or turn while at the same time they should have a certain degree of freedom, a certain flexibility in relation to the support in order to withstand shocks on the occasion of violent braking.

Another important characteristic feature of the invention arises from the fact that the lining according to the invention makes it possible to grip the flange on the friction stud more or less strongly, by making a suitable choice both of the mechanical characteristics of the materials, particularly the flexibility, and of the greater or lesser tensioning of the plates during their final assembly, bringing the plates closer or less close to each other by the said mechanical connecting means.

Thus, it is a great advantage of the invention to be able separately to measure firstly the flexibility of the studs in relation to their support and secondly the flexibility of the support itself in order to be able to adapt the brake lining to the conditions of use.

Finally, the improvement in the quality of production, the word quality being understood here to mean the absence of manufacturing faults, comes, as will be clearly evident from the description of the manufacturing process (see example and FIGS. 4a to 4c) from the fact that the unitary operations are small in number (manufacture of the studs, of the two plates forming the support and mounting of these elements), the fact that they can be produced with minimal risk of error (possibly automated sequences) and the fact that, furthermore, the linings produced are easily checked, particularly by visual control).

DESCRIPTION OF THE DRAWINGS

All the drawings constitute examples of the invention.

In FIG. 1a, only the mounting plate (6) comprises a localised deformation of thickness E, whereas the support plate (7) carries the male connecting elements (21).

In FIG. 1b, only the support plate (7) comprises a localised deformation of thickness E and carries the male connecting elements (21).

In FIG. 1c, the two plates (6) and (7) comprise a localised deformation of thickness E, the mounting plate (6) Carrying the male connecting elements (21).

In FIG. 2a, the flange is discontinuous and comprises an alternating pattern of 3 annular relief portions (14) and 3 annular recessed portions (no flange).

In FIG. 2b, the flange (130) is continuous but has no axial symmetry.

FIG. 3a is a plan view and FIG. 3b a cross-section taken on the line I—I in FIG. 3a. Shown is the fixing lug (12) which makes it possible to fix the lining to the transport means.

FIG. 4a shows the 3 elements to be assembled: the friction stud (2) with a flange (13), the mounting plate (6) and the support plate (7), the mounting plate (6) comprising a ring (11) with a part which is deformed in relief, and fixing orifices (22), the support plate (7) comprising two small sleeves (21), these two plates being obtained by deformation of a metallic strip. FIG. 4b shows the same 3 elements in the assembled position.

FIG. 4c shows the assembly, pressure being exerted on either side of the plates (6) and (7) and flaring out the small sleeves (21).

FIGS. 5a and 5b show in longitudinal section on the axis (24) various types of friction stud according to the invention which differ by virtue of the geometrical form of the base (9), which is of low height in relation to FIG. 5a, and of the same height as the friction block in FIG. 5b.

FIGS. 6a to 6e show the example according to the invention on a scale of 1:1.

FIG. 6a is a plan view of the lining produced according to the example.

FIG. 6b is a cross-section taken on the line I—I in FIG. 6a, FIG. 6c showing an enlargement of the part circled in FIG. 6b.

FIG. 6d is a view of the same lining from below, FIG. 6e being a cross-section taken on the line II—II in FIG. 6d.

DETAILED DESCRIPTION OF THE INVENTION

The invention can be carried out in a number of ways all of which make it possible to achieve the objects of the invention.

Figure 1A:
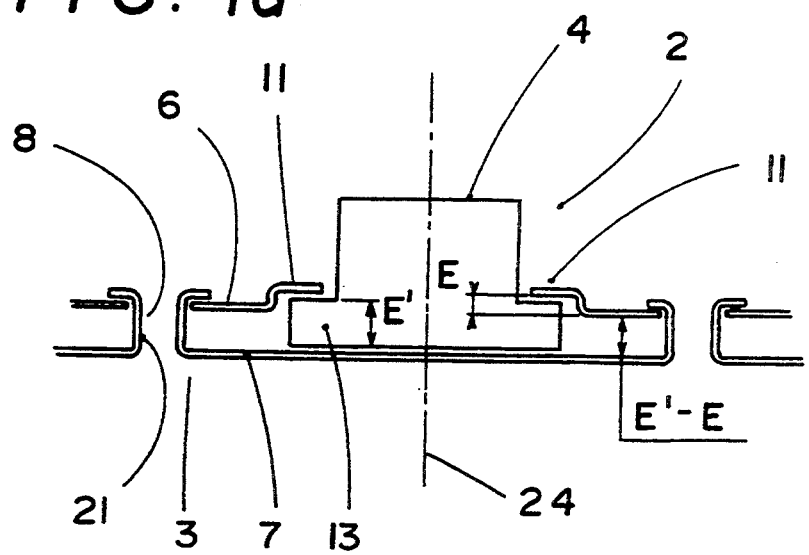
FIGS. 1a to 1c are cross-sections taken on the axis (24) through the friction block (4), different methods of deforming the plates (6, 7) making it possible to obtain a localised deformation of thickness E, and different methods of mounting the two plates (6) and (7).

According to a first embodiment of lining according to the invention, shown diagrammatically in FIG. 1a, the mounting plate (6) has the said localised deformation and rotational locking of the friction stud (2) may be achieved in three different ways.

Figure 2A:
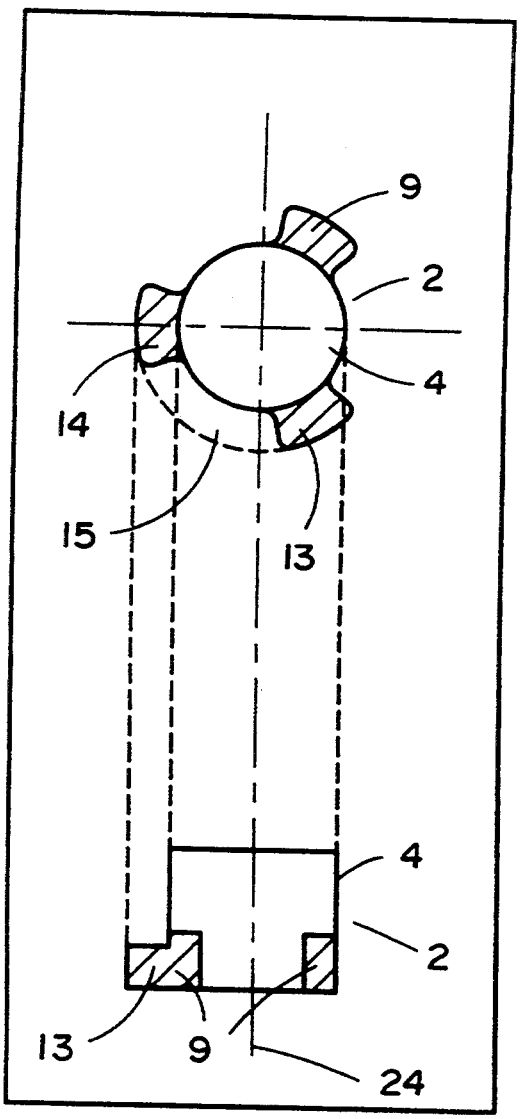
FIGS. 2a and 2b show friction studs seen from above and section on the axis (24) through the friction block, in order to illustrate various types of flange (13) making it possible, by cooperation with a localised deformation of a mounting plate (6) and/or support plate (7), to lock the friction stud so that it cannot rotate.

Firstly, the said flange (13) may be discontinuous and comprise at least one alternating pattern of an annular relief portion (14) and an annular recess portion (15). The said ring (11) comprises, according to the same said alternating pattern, parts which are deformed in relief (16) and plane parts (17). Each said recessed annular portion (15) engages each said plane part (17) in such a way as to ensure rotational locking of the said stud. Each said annular relief portion (14) is gripped between each said deformed part (16) of the said ring (11) and the said rigid support plate (7) in order to assemble the said stud (2) and the said support (3). This alternative embodiment is illustrated in FIG. 2a.

Figure 2B:
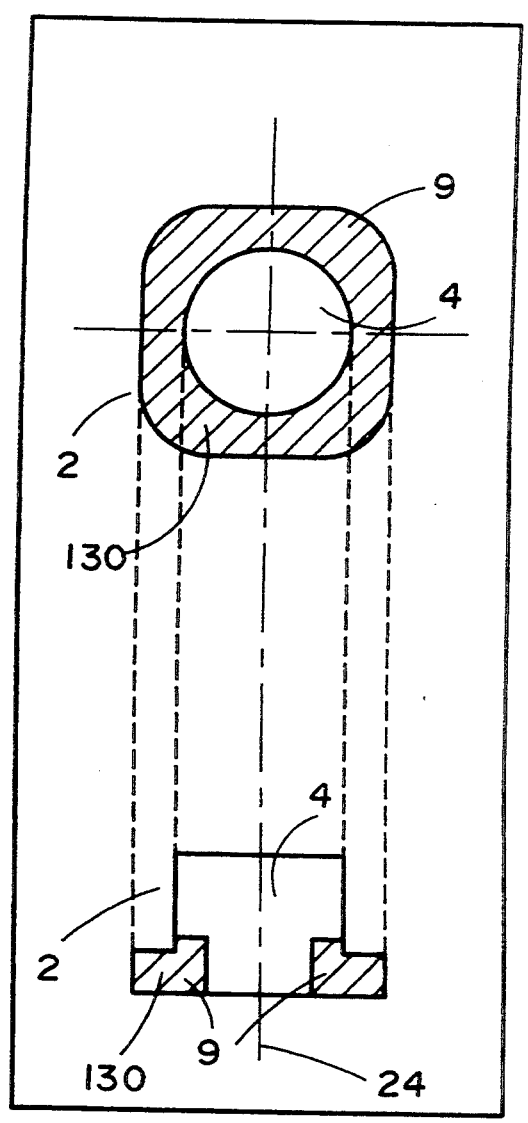
Figure 3A:
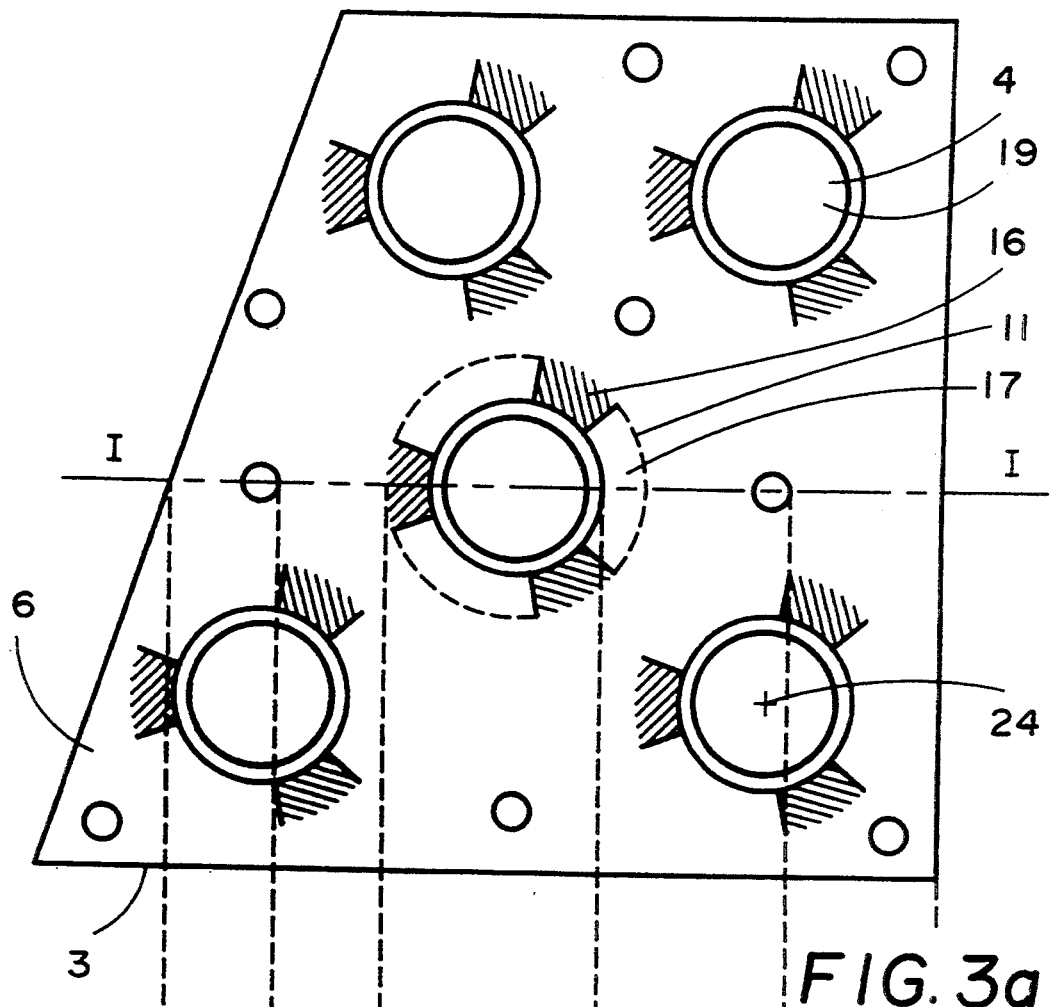
FIGS. 3a and 3b show a brake lining with studs (studs of the type shown in FIGS. 2a).
Figure 3B:
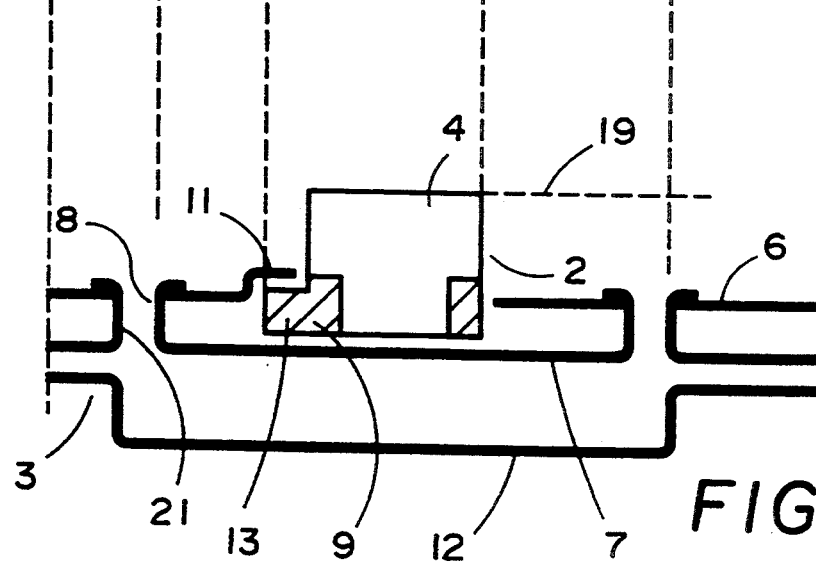
Figure 4A:
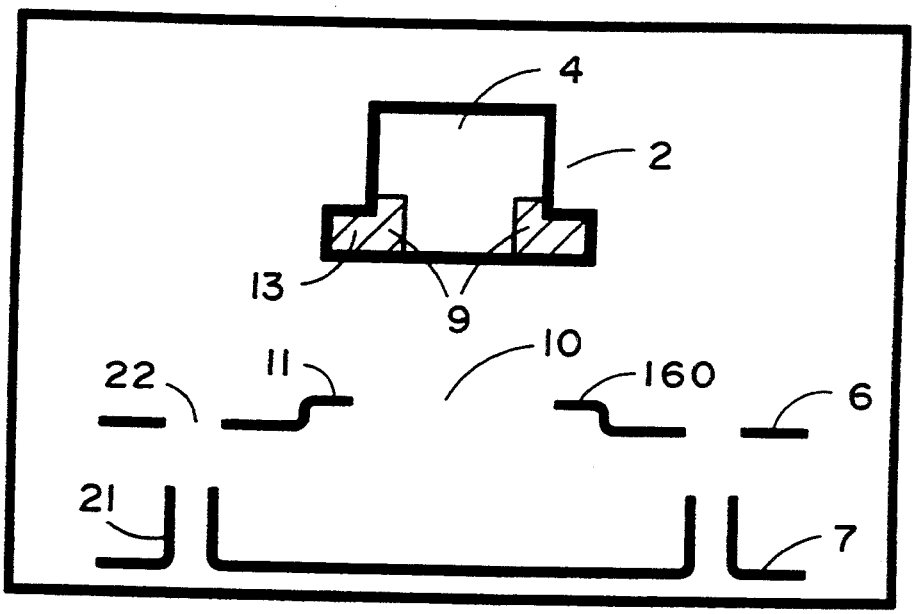
FIGS. 4a to 4c diagrammatically show in cross-section taken on the axis (24) of the friction block the manufacture of a lining according to the invention.
Figure 4B:
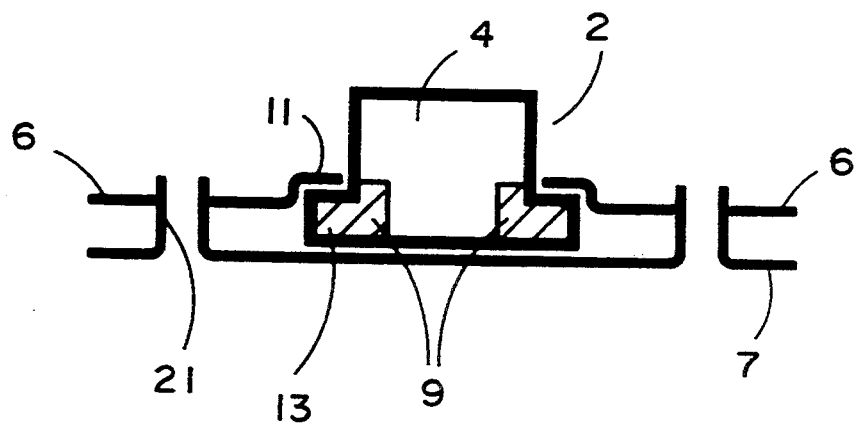
Figure 4C:
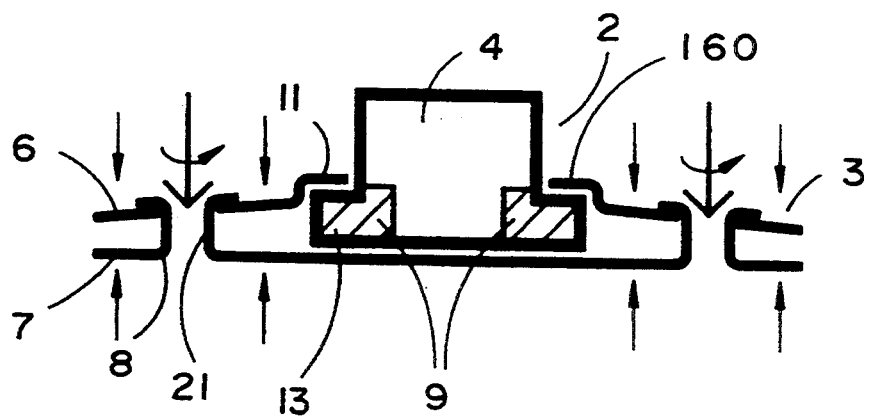
Figures 6D, 6E:
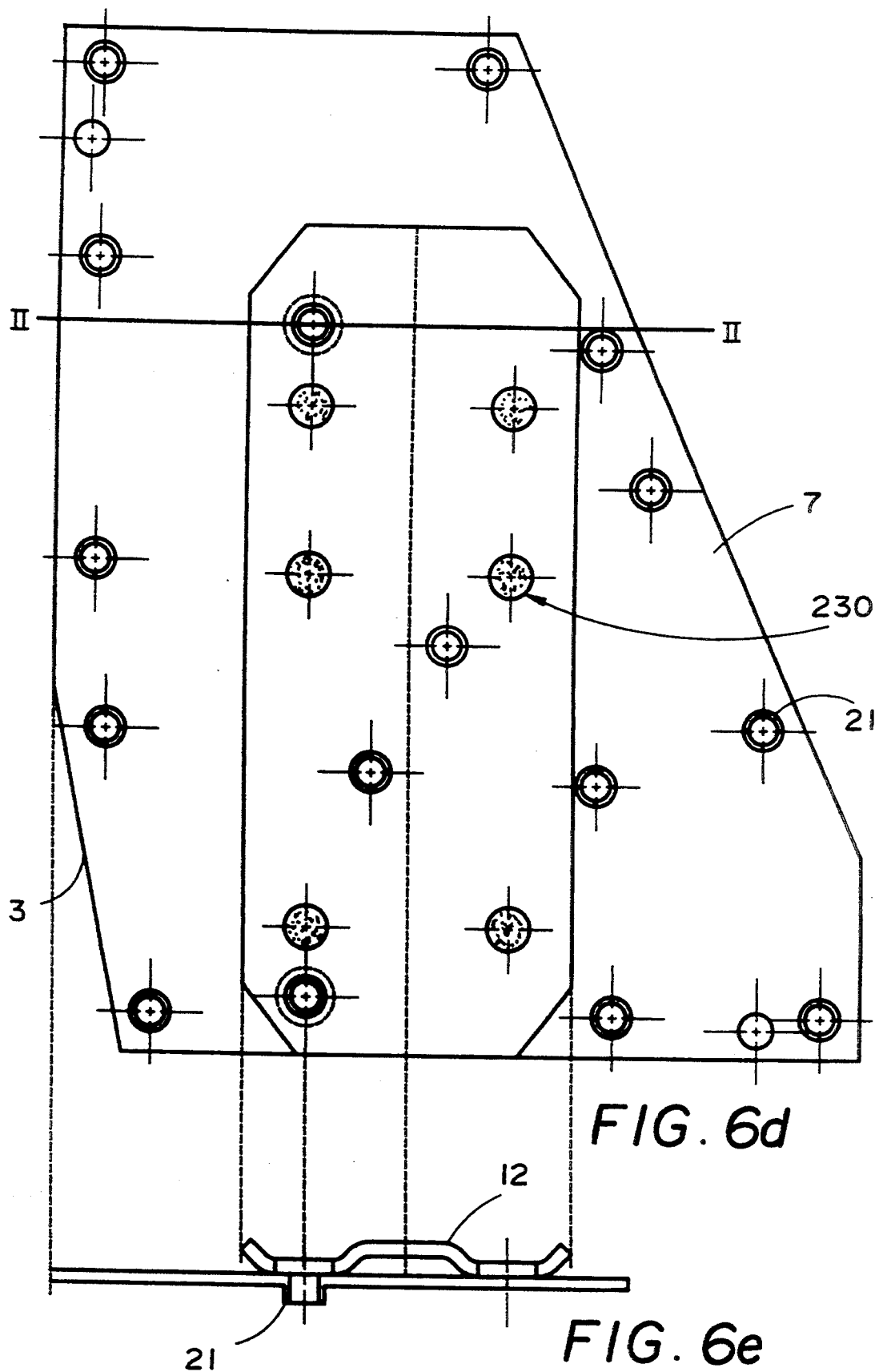

According to a second alternative embodiment, the said flange (130) forms a continuous relief, the said ring (11), with no axial symmetry, having a part (160) which is deformed in relief, adapted to the said flange (130). The said flange (130) is gripped between the said ring (11) and the said rigid support plate (7) in such a way that it simultaneously ensures rotational locking of the said stud (2) and its assembly together with the said support (3). This alternative embodiment is illustrated in FIG. 2b.

In accordance with a third alternative embodiment, obvious in itself, the rotational locking results from the fact that the friction block (4) itself does not have any axial symmetry and the orifices (10) in the mounting plate (6) have a cross-section close to that of the friction block. However, these blocks which have no axial symmetry do not seem to have any advantage over friction blocks with axial symmetry and of typically cylindrical form.

Figure 1B:
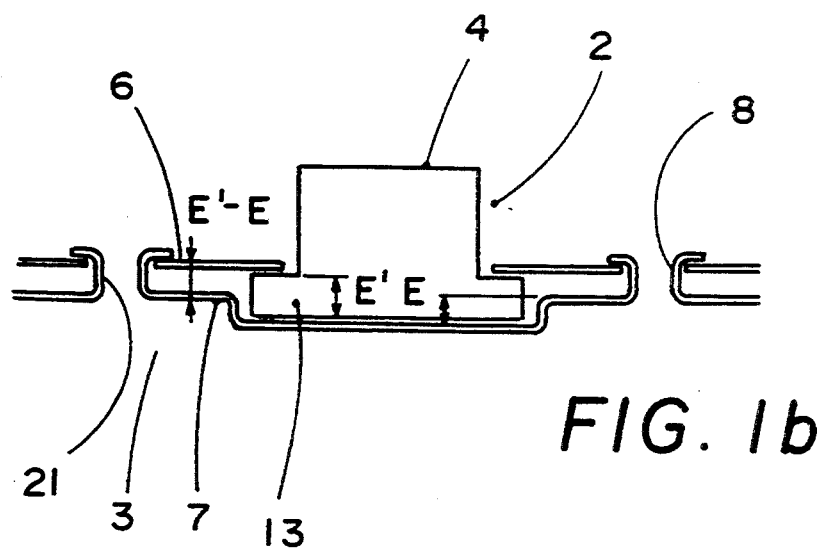

According to a second embodiment of lining according to the invention, the said support plate (7) displays the said localised deformation, rotational locking of the friction stud (2) possibly being obtained by any of the three different alternative embodiments previously described. This second embodiment is shown in FIG. 1b.

Figure 1C:
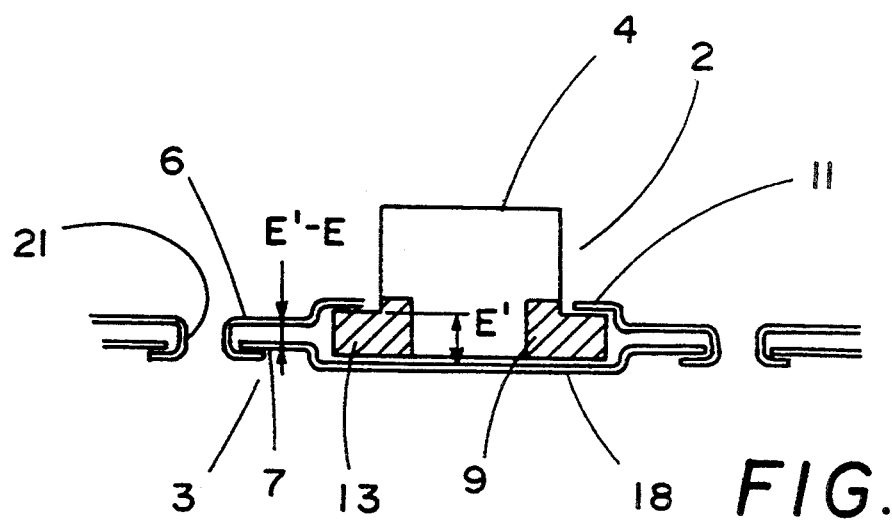

Finally, in accordance with a third embodiment shown in Fig. 1c, the said mounting plate (6) and the said rigid support plate (7) display the said localised deformation.

As has already been stipulated, the friction studs (2) are rendered rigid with the support (3) solely by gripping the flanges (13) between the two plates (6) and (7) forming the support and of which at least one of the two comprises, for each stud, a localised deformation having a cross-section which is slightly greater than that of the flange, this localised deformation (16, 160, 18) being intended to clamp and lock the base (9) of the friction stud (2).

This localised deformation has a height E (distance according to the axis (24) between the flat part and the deformed bearing part). It goes without saying that when the said localised deformation is present on both plates (6) and (7), the height E corresponds to the sum of the heights of each of the two localised deformations. See FIGS. 1a to 1c. Outside of the localised deformation, the distance between plates (6) and (7) is less than $0.5 \times E'$. This distance is substantially equal to $E' - E$. It is preferably less than $0.1 \times E'$ so that it can effectively grip the said flange (13, 130). If this distance is too great, rotational locking is inadequate. On the other hand, it is necessary to have $E' > E$ in order to obtain sufficient tensioning of the plates (6) and (7) so ensuring adequate pressure on the flange (13).

As already stressed, an important characteristic of the invention both in order to ensure constant quality of product and in order to obtain a high performance lining which is adaptable to the needs of clients, resides in the choice of the means of the connecting the two mounting (6) and support (7) plates. The mechanical means (8) of connecting the mounting and support plates comprise metallic sleeves (21) obtained by deformation (deep drawing, snarling) of one of the mounting or support plates, at the flared out end after passing through the orifices (22) for fixing of the other of the mounting or support plates in order to obtain a riveting effect for tensioning the plates one in relation to the other without thereby rendering them totally rigid with respect to each other as might be caused by a mechanical connection by welding or even by riveting.

The two plates, the mounting plate (6) and the support plate (7), therefore retain a certain flexibility in respect of each other, particularly in the axial direction.

This mechanical method of connection may be distributed as desired over the entire support (3). It is therefore possible to choose a compression of the flange (tension between the plates forming the support) which might be different according to the position of the friction stud on its support, for example it may not apply the same compression at the centre as at the edge of the support. However, generally, the said mechanical connecting means (8) (sleeves (21) on a plate and fixing orifices (22) on the other plate) are distributed in a substantially regular fashion over the whole of the said support (3) in such a way that each friction stud (2) is preferably surrounded by 2 to 4 so-called mechanical connecting means.

This preferred method of connection does not exclude the possibility of using welding at the periphery of the support. Indeed, the Applicants have observed that this might well be advantageous, particularly in order to attenuate vibrations to the extent that over and above the connecting means according to the invention, the edges of the two mounting (6) and support (7).plates are welded, or offer welding points (23) at the periphery of the said lining.

With regard to the choice of materials constituting the lining, a distinction must be made between the material constituting the plates (6) and (7), the material constituting the friction block (4) and the material constituting the base (9).

The material used for the said plates (6, 7) is still chosen from among the metal alloys, preferably steel. These plates generally have a thickness comprised between 1 and 4 mm.

It is possible to use different shades of steel for each of the plates, according to the desired flexibility and the aptitude for deformation (shaping in order to obtain the said sleeves and the said localised deformation).

At least one of the said plates is preferably a steel having a high elastic limit.

Preferably, either two steel plates with a high elastic limit are used or a combination of a plate made from steel of high rigidity and a plate of steel with a high elastic limit. The shades which can be used according to the invention should preferably be chosen from among those shades ranging from E240C to E355C on the one hand and from E315D to E690D on the other, these designations complying with French Standards NF A36-231 and NF A36-232.

With regard to the material constituting the said friction block (4), it is known in itself, generally it is sintered material (metallic powders, ceramic powders) or carbon.

With regard to the material of the base (9), this is generally a steel having high mechanical properties, good heat resistance and low sensitivity to divergences in temperature an emergency braking may result in a rapid rise of the base to 800° C., As an example of a material suitable for forming a base, a type 15CDV6 steel may be quoted, a designation conforming to the Standard AIR 9160/C.

EXAMPLES

The drawings on sheets 1 to 9 show examples according to the invention.

The detail of a production of a brake lining according to the invention and shown in FIGS. 6a to 6e is described hereinafter.

Figure 7A:
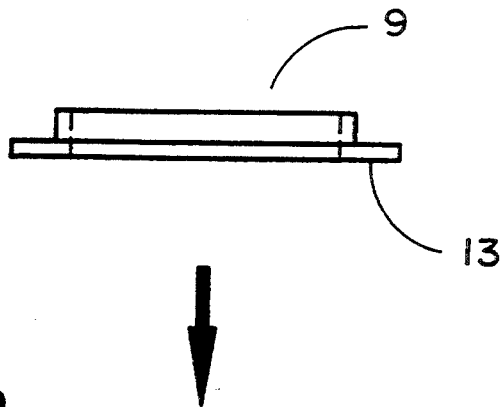
FIGS. 7a to 7c show in cross-section the manufacture of a friction stud (2) by manufacture of a base (9) (FIG. 7a), a sintered friction block (4) (FIG. 7b) and the assembling of these two elements (FIG. 7c).
Figure 7B:
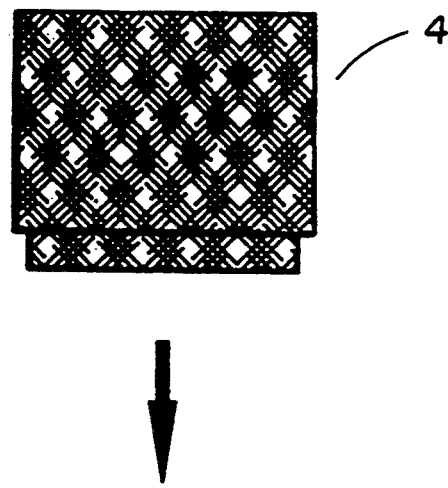
Figure 7C:
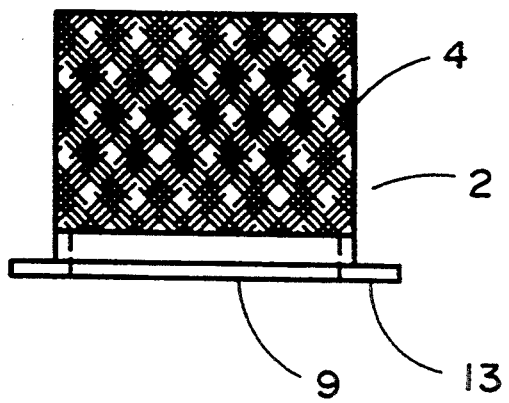

A) Manufacture of the friction studs (2):

This is shown diagrammatically in FIGS. 7a to 7c and includes the production of a base (9) with sand blasting and deposition of a braze-welding coating on the interior surface of a friction block (4) by sintering and the assembly of the base and friction block under heat and load in order to form a friction stud (2).

B) Production of the assembly plate (6) and support plate (7):

B1: the mounting plate (6) shown in FIG. 6c is obtained from a strip of steel (grade E355C according to the already mentioned NF Standard), 1.5 mm in thickness, after deep drawing on a press. Shaping includes:

the formation of 9 orifices (10) intended to allow passage of the friction block (4), and 40 mm in diameter;

localised deformation of each of the 9 metal rings (11) surrounding these orifices (10): for each ring (11), formation of 3 relief portions of flange (16), 2 mm of height E, and 3 mm in width, alternating with 3 flange portions (17) of the ring with no deformation;

formation of 16 fixing orifices (22) 7.5 mm in diameter.

B2: The support plate (7) shown in FIG. 6c is obtained from a strip of steel (grade E280C according to the already mentioned NF Standard), 2 mm thick, after deep drawing on a press. Shaping comprises the formation of 16 small sleeves 4.8 mm high and having an outside diameter of 7.5 mm.

C) The friction studs and the two plates constituting the support are assembled as follows:

the studs are introduced into housings or orifices (10) in the mounting plate (6). The two plates, the mounting plate (6) and support plate (7), are superimposed and fitted together by pressure on a press to bring the friction studs (2) under stress from the flanges (13). Then, the ends of the two sleeves (21) are folded back to immobilise the assembly comprising the two plates, the mounting plate (6) and the support plate (7). Assembly is completed by 6 spot welds at the periphery of the lining which diminishes the curvature between the two plates and the vibrations of the brake lining.

Thus, a brake lining (1) is obtained which has 9 studs (2), these studs being maintained gripped and fitted with no clearance between the two plates (6, 7) constituting the support (3) which ensures both individual flexibility of the studs and a solid assembly. As coordinates in mm in relation to the origin O of the axes X-Y (see FIG. 6a), these studs have:

| | Stud No: | | | | | | | | |
|---|---|---|---|---|---|---|---|---|---|
| | 1 | 2 | 3 | 4 | 5 | 6 | 7 | 8 | 9 |
| X: | 30 | 75.5 | 125 | 107 | 75.3 | 37.7 | 23.5 | 75 | 34.5 |
| Y: | 37.5 | 25 | 33.5 | 81.5 | 111.5 | 82.5 | 124 | 155 | 172 |

The performances of the lining are evaluated in two ways:

firstly, by a shearing resistance test of the sleeves: failure is observed for a stress in excess of 800 daN per sleeve, which ensures a wide safety margin, having regard to the number of sleeves per lining. Indeed, a brake disc typically has two pads per face and is subjected to a shearing stress which is generally less than 3000 daN, in other words 750 daN per brake pad, so that one single sleeve per brake pad will be sufficient to maintain assembled the plates (6, 7) constituting the support (3);

furthermore, by simulation test of 300,000 km on a test bench, a test covering 6,000 brakings: all the tests performed have shown firstly a total absence of stud loss in contrast to what has been observed with prior art brake linings, and also a perfect preservation of the lining apart from normal wear and tear on the friction blocks.

ADVANTAGES OF THE INVENTION

As already mentioned, the invention makes it possible simultaneously to resolve the problem of the loss of studs during the course of the effective life of the brake linings, the problem of economical and viable production of these linings and the problem of the guarantee of quality.

Indeed, the Applicants have compared assembly by welding of the studs and according to the invention and has found an assembly time which is approximately 5 times greater in the case of assembly by welding than in the case of assembly according to the invention.

Furthermore, with the mechanical means of connecting the two plates (6) and (7) according to the invention and, as has been verified by comparing a production of linings with riveting of plates and with connection according to the invention, it is impossible "to forget" a connection point, as frequently happens with a connection by welding or riveting. Indeed, manufacture of the small sleeves, like the flaring of the end of each sleeve at the time of assembly, can be carried out simultaneously by simple devices, whereas the same result in the case of riveting or welding generally involves the use of sophisticated and expensive automatic devices.

Furthermore, final quality control is far more simple and reliable in the case of the present invention: a simple visual examination is sufficient while evaluating the quality of a weld is a problem which is both difficult and costly.

It is important also to stress that the fact of using a connecting means of the same material as the support (plates (6) and (7)) and therefore having the same electrochemical properties (for example the oxido-reduction potential) is a great advantage in relation to a connecting means of the rivet or weld type, with regard to corrosion resistance (electrochemical corrosion), which helps to increase the life of the lining.

Finally, as has already been mentioned, the invention has great possibilities for variation:

variations of a geometrical nature as illustrated in the various drawings;

variations in the choice of materials, particularly the choice of grades of steel of chosen elasticity;

fluctuations in tension between the plates and flange on each stud;

variations in this tension according to the position of each stud on the lining.

All these variations make it possible to adapt the brake linings to the particular demands and conditions of operation peculiar to each customer.

The invention is applied to all braking devices which employ linings with studs, that is to say mainly in railway transport means including high-speed trains.

We claim:

1. A brake lining (1) constituted by friction studs (2) mounted on a support (3) and forming a friction surface (19), each of the said friction studs (2) comprising a friction block (4) of which the cross-section is constant over its entire height, rigid with an assembly element for mounting the said stud on the said support, the said support comprising at least one rigid metal support plate (7) provided with a fixing lug (12), characterised in that a) the said assembly element consists of a base (9) of the said friction block (4) having a flange (13) with no axial symmetry and outside a perpendicular projection of the said block (4) on the said support (3)

b) the said support (3) consists of two metal plates, said one rigid support plate (7) provided with the said fixing lug (12), and a mounting plate (6) comprising orifices (10) of which the cross-section is close to that of the said block (4), so that the said flange (13) can be gripped between all or part of a ring (11) on the said mounting plate (6) defining each said orifice (10) and the said rigid metal support plate (7), via mechanical connecting means (8) between these two plates (6, 7) comprising cooperation of male elements (21) on one plate with corresponding female elements (22) on the other plate, c) at least one of the said plates (6, 7) has a localised deformation of depth E, close to said orifices, co-operating with all or part of the said flange (13) of thickness E' greater than E, in such a way as to grip the said flange and so achieve rotary locking of the said friction stud (2).

2. A lining according to claim 1 in which the said mounting plate (6) displays the said localised deformation.

3. A lining according to claim 2 in which the said flange (13) is discontinuous and comprises at least an alternating arrangement of an annular relief portion (14) and an annular hollow portion (15), in which the said ring (11) comprises, according to the same said alternating pattern, parts which are deformed in relief (16) and plane parts (17), in which each said hollow annular portion (15) meshes in each said plane part (17) in order to produce a rotational locking of the said stud and in which each said annular relief portion (14) is gripped between each said deformed part (16) of the said ring (11) and the said rigid support plate (7) in order to assemble the said stud (2) and the said support (3).

4. A lining according to claim 2 in which the said flange (130) forms a continuous relief, in which the said ring (11), with no axial symmetry, has a part (160) deformed in relief and adapted to match the said flange (130), and in which the said flange (130) is gripped between the said ring (11) and the said rigid support plate (7) in order to ensure simultaneously rotational locking of the said stud (2) and its assembly together with the said support (3).

5. A lining according to claim 1 in which the said rigid support plate (7) has the said localised deformation.

6. A lining according to claim 1 in which the said mounting plate (6) and the said rigid support plate (7) display the said localised deformation.

7. A lining according to any one of claims 1 to 6 in which, in order to be able effectively to grip the said flange (13, 130) the distance between plates (6) and (7), outside of the localised deformation, is less than $0.5 \times E'$.

8. A lining according to any one of claims 1 to 6 in which the said mechanical means (8) of connecting the plates (6, 7) comprise small metal sleeves (21) defining said male elements and obtained by deformation through deep drawing or snarling of one of the mounting or support plates, at the flared end after passing through fixing orifices (22), defining said female elements, of the other of the plates in order to obtain a riveting effect bringing the plates in tension the one in relation to the other.

9. A lining according to claim 1 in which the said mechanical means (8) connecting the plates comprise small metal sleeves (21) defining said male elements and obtained by deformation through deep drawing or snarling of one of the mounting or support plates, at the flared end after passing through fixing orifices (22), defining said female elements, of the other of the plates in order to obtain a riveting effect bringing the plates in tension the one in relation to the other, said mechanical connecting means (8) being distributed over the assembly of the said support (3) in such a way that each friction stud (2) is substantially surrounded by preferably at least three said mechanical connecting means.

10. A lining according to claim 9 in which the said mechanical connecting means (8) comprise welding points (23) on the periphery of the said lining.

11. A lining according to claim 1 in which the material constituting the said plates (6, 7) is chosen from among the metal alloys, preferably steel.

12. A lining according to claim 11 in which the material of at least one of the said plates is preferably a steel with a high elastic limit.

13. A lining according to claim 12 in which the said friction block of the said friction stud is of sintered material, said material being metallic powders or ceramic powders or carbon.

* * * * *